(12) United States Patent
Goeller et al.

(10) Patent No.: US 9,787,650 B2
(45) Date of Patent: Oct. 10, 2017

(54) SYSTEM AND METHOD FOR MULTIPARTY BILLING OF NETWORK SERVICES

(75) Inventors: Thomas Anton Goeller, Munich (DE); Tet Hin Yeap, Ontario (CA)

(73) Assignee: Toposis Corporation, Ottawa (CA)

( * ) Notice: Subject to any disclaimer, the term of this patent is extended or adjusted under 35 U.S.C. 154(b) by 1212 days.

(21) Appl. No.: 12/741,802

(22) PCT Filed: Nov. 7, 2008

(86) PCT No.: PCT/CA2008/001946
§ 371 (c)(1),
(2), (4) Date: May 6, 2010

(87) PCT Pub. No.: WO2009/059408
PCT Pub. Date: May 14, 2009

(65) Prior Publication Data
US 2010/0250437 A1    Sep. 30, 2010

Related U.S. Application Data

(60) Provisional application No. 60/996,239, filed on Nov. 7, 2007.

(51) Int. Cl.
*G06F 21/00*    (2013.01)
*H04L 29/06*    (2006.01)
(Continued)

(52) U.S. Cl.
CPC ......... *H04L 63/0442* (2013.01); *G06Q 30/04* (2013.01); *H04L 12/14* (2013.01);
(Continued)

(58) Field of Classification Search
CPC .................................................. G06Q 20/085
(Continued)

(56) References Cited

U.S. PATENT DOCUMENTS 6,240,091 B1 *   5/2001   Ginzboorg ............. H04L 12/14
                                                        370/270
6,282,274 B1 *   8/2001   Jain et al. ................ 379/114.26
(Continued)

*Primary Examiner* — Charles C Agwumezie

(57) ABSTRACT

A scalable, distributed system and method for communicating originating network information for multiparty billing of network services, with authentication of originating network attributes, having particular application when value added services are provided to subscribers of other networks, for which price is determined at the terminating end. An originating network attribute, e.g. an originating network identification, is associated with a private-public key pair of the originating network operator, a service request is generated comprising an network attribute pair containing a clear text attribute and an encrypted attribute, encrypted with the private-key of the originating network operator. Authorized parties having a billing relationship with the originating network operator have access to public keys for decryption and verification the originating network identification prior to forwarding of the service request for completion and billing. An attribute pair may be provided as an extension of known service request protocols, and the network attribute may optionally include originating network identification, subscriber information, and other information associated with the service request.

14 Claims, 3 Drawing Sheets

Secure Multiparty Service Request

(51) Int. Cl.
*G06Q 30/04* (2012.01)
*H04L 12/14* (2006.01)
*H04M 15/00* (2006.01)
*H04W 4/24* (2009.01)

(52) U.S. Cl.
CPC ........ *H04L 12/1471* (2013.01); *H04L 63/126* (2013.01); *H04M 15/00* (2013.01); *H04W 4/24* (2013.01); *H04L 63/0823* (2013.01)

(58) Field of Classification Search
USPC .......................................................... 705/59
See application file for complete search history.

(56) References Cited

U.S. PATENT DOCUMENTS

| | | | |
|---|---|---|---|
| 7,047,414 B2 | 5/2006 | Wheeler et al. | |
| 7,089,211 B1 | 8/2006 | Trostle et al. | |
| 7,127,606 B2 | 10/2006 | Wheeler et al. | |
| 7,234,060 B1 | 6/2007 | Amdur et al. | |
| 7,248,694 B2 | 7/2007 | Husemann et al. | |
| 7,363,244 B2 * | 4/2008 | Staddon et al. | 705/7.38 |
| 2003/0185240 A1 | 10/2003 | Vuong | |
| 2007/0198831 A1 * | 8/2007 | Suzuki | H04M 1/72522 713/156 |
| 2013/0117828 A1 * | 5/2013 | Larsen | H04L 41/12 726/5 |

* cited by examiner

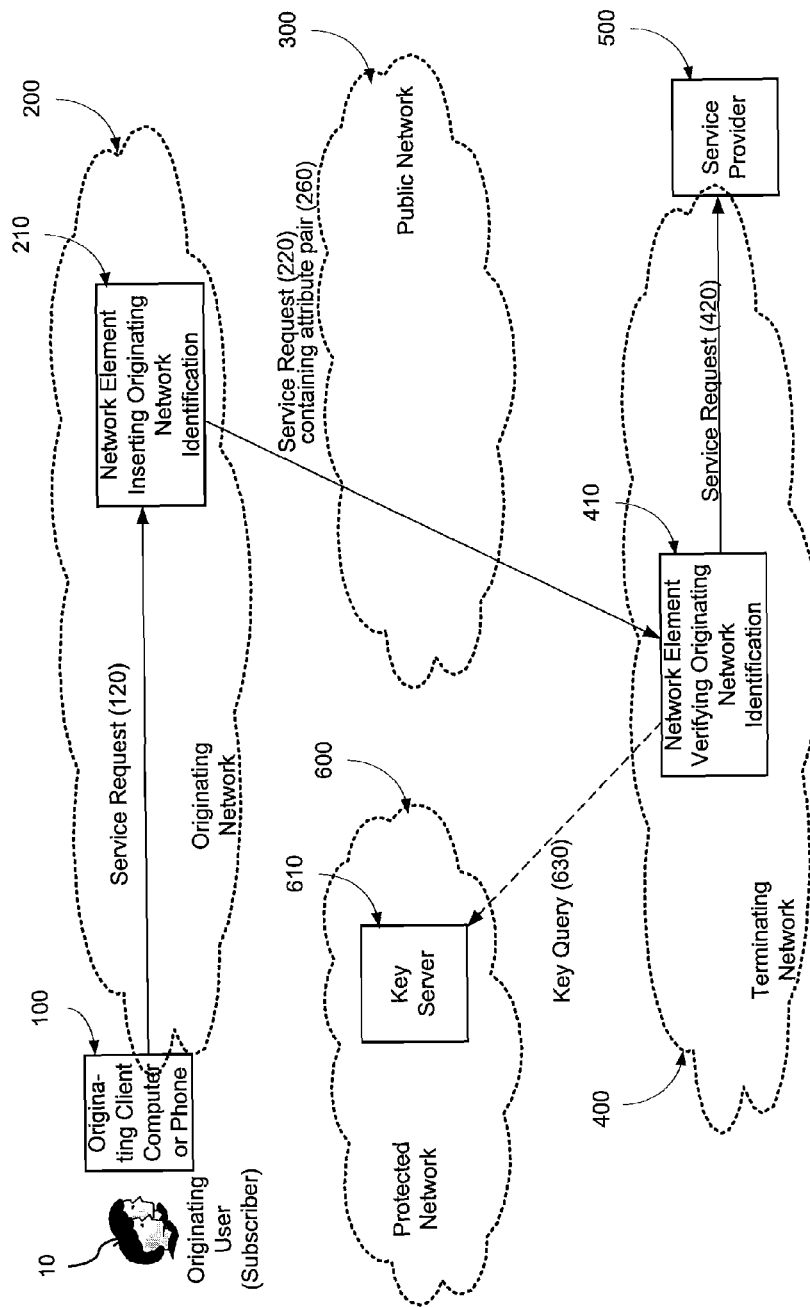
Figure 1: Secure Multiparty Service Request

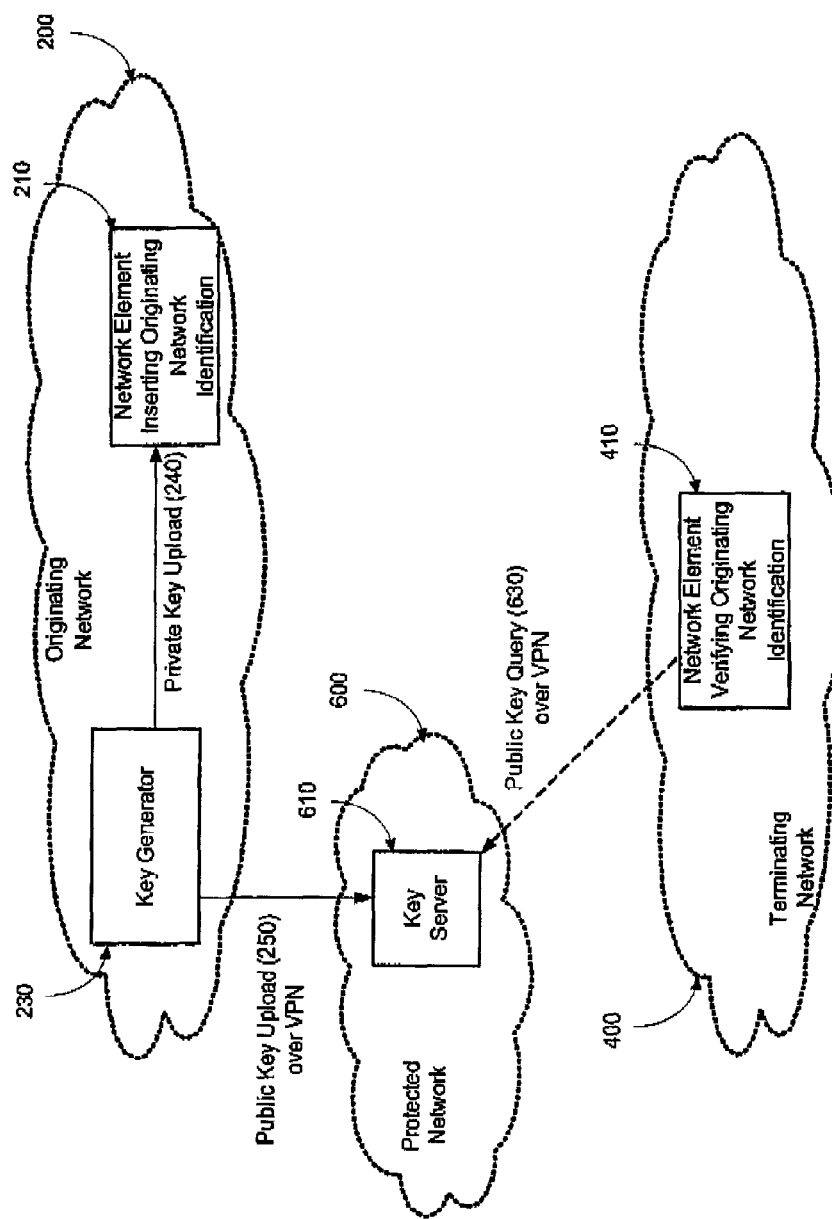
Figure 2: Secure Multiparty Key Distribution

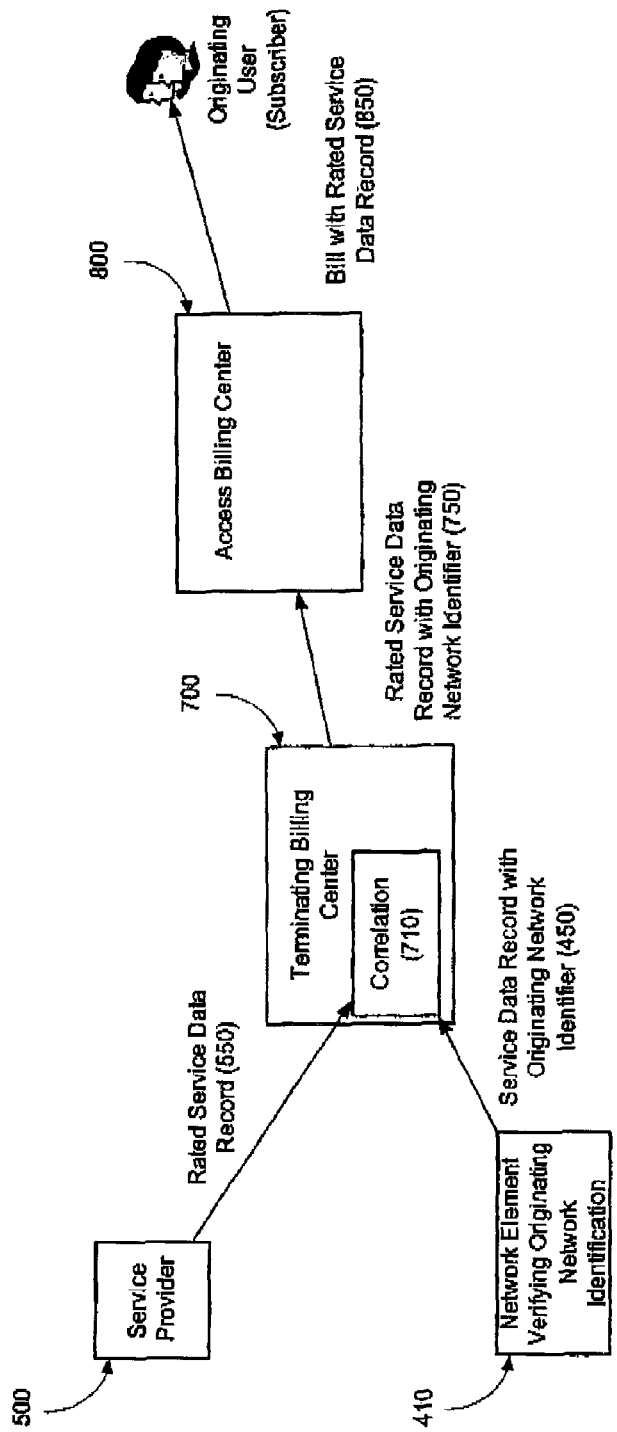
Figure 3: Billing Flow

SYSTEM AND METHOD FOR MULTIPARTY BILLING OF NETWORK SERVICES

CROSS-REFERENCE TO RELATED APPLICATIONS

This application is related to U.S. patent application Ser. No. 11/601,872 filed 20 Nov. 2006 entitled "Open and distributed systems for secure email service" and claims priority from U.S. Provisional Patent application Ser. No. 60/996,239 entitled "System and method for secure electronic communication services" filed 7 Nov. 2007, both to the same inventors, which are herein incorporated.

FIELD OF INVENTION

This invention relates to multiparty billing of network services, and more particularly to a method and system for transmitting originating network operator information from an originating network operator to a terminating network operator for multiparty billing of telecommunications services with improved reliability.

BACKGROUND OF THE INVENTION

Traditionally, telecommunication services have been provided by the Public Switched Telecommunication Network (PSTN). In this type of network, a service (typically a telephone call) is preceded by signaling to request and accept a connection. Signaling at the beginning, during, and at the end of a service is used for charging the service. Charging can be implemented in non-real-time or postpaid mode via charging records produced by the signaling entities, or in real-time mode (mandatory in prepaid billing) where an account is identified, reserved and charged in the course of signaling interactions.

This charge model is applicable to call or session billing, both for connection and usage (e.g. duration, traffic) charges. The model is also applicable to content billing, when each request for separately charged content comprises signaling for requesting and accepting the delivery of the content. Although the latter negotiation for content billing happens on a higher protocol level than call or session setup signaling, signaling is distinct from the chargeable content delivered to the user.

In the telecommunications world, simple services delivered in high volume may have a fixed price negotiated in advance by network operators, e.g. the price per minute for a call from a subscriber A1 of network operator A in the United States to a subscriber B1 of network operator B in Australia. On a subscriber level, subscriber A1 knows the price charged per minute by operator A for a call to subscriber B1, and on an operator level, operator A knows the price charged by operator B or a transit operator to deliver the call from operator A's network to subscriber B1. This is known as origin charging, or "bill and keep". When this is the only model used for service charging, charges can be predetermined by access operator A.

More complex services cannot be handled as described above, i.e. when the service delivered cannot be counted in connections, duration or traffic. Examples would be expert hotlines provided over premium rate numbers, or downloads of variably priced music titles from an online store. In such cases, the service provider would need to determine the appropriate charge during the actual service delivery, and an example of this type of charge is called termination or service provider charging. Typically, termination charging is simple when the service provider has a direct billing and collection contract with the network operator of an end user or subscriber who uses the service.

On the other hand, in today's multi-carrier world, conventional termination or service provider charging would require significant effort by the service provider's network operator to filter calls to the service from many other networks. An inordinate effort may be required of the service provider to connect to all potential networks to which service may be desired. Either the service provider or the network operator has to find out which network operator a service request originates from, and determine whether a service request should be accepted or refused. When the request originates from an operator that has a bilateral invoicing and collection agreement with the service provider's operator ("good case") the service may be delivered. When the service request originates from another operator without a billing relationship ("bad case"), service is refused. It is straightforward to determine the requestor's operator in the operators own network, but it may be very difficult to identify the originating network identification for calls coming from other networks, since the interconnection partner may be the access network operator for the subscriber requesting the service or may be just a transit network operator. Determining the originating operator by caller number inspection may be problematic in networks where Number Portability is possible. A database query has to be performed to determine the originating network operator from the network supplied Calling Line Identifier. In many countries, reliability of Number Portability database information is limited, particularly close to the porting time. This opens up specific possibilities for error or fraud relating to identification of the originating operator for termination billed services. The same issues may arise for email addresses, signatures and other subscriber identifications. With respect to potential email address portability, because an email address, is a globally unique user identifier, just like a E.164 telephone number, it is not clear yet whether an address like first.last@aol.com would have to be ported to another access network operator, or whether users who want portability would be required to register their own domain with email addresses, e.g. me@first-last.net. In any case, it would not be trivial to find out the current originating access network operator for a user with a specific email address, or SIP URI.

So, for termination billing, in addition to transporting the user identity, there is a need to transport the originating network identity reliably to determine service availability. In a conventional PSTN network, transport of the originating network identification has been proposed in Germany for the signaling network, using an Originating Network Identification Parameter (ONIP). By providing the originating network identification using ONIP in a PSTN network, bilateral invoicing and billing has been practised successfully in PSTN networks because it is relatively difficult for hackers to access and manipulate such information in a dedicated PSTN network. Nevertheless, IP based networks are potentially more open to such threats and fraudulent activity, and thus improved integrity protection of the originating operator identity is needed to enable a terminating network to identify and verify (i.e. authenticate) an originating network identification more reliably for billing purposes in IP networks.

SUMMARY OF THE INVENTION

The present invention seeks to overcome or circumvent above-mentioned limitations of known billing systems and methods, or at least provide an alternative.

One aspect of the invention provides a system for communicating originating network information for multiparty billing of network services, comprising; a network element for inserting into a service request an originating network attribute and an encrypted originating network attribute encrypted with the private-key of a private-public key pair of an originating network operator; a public-key server storing the respective public-key and providing access for public-key lookup to authorized parties; a network element for receiving a service request containing an originating network attribute and an encrypted originating attribute, extracting the originating network attribute, accessing the key server to look up the associated public-key, decrypting and verifying the originating network attribute, and forwarding of the service request for completion.

Another aspect of the present invention provides a method of communicating originating network information for multiparty billing of network services, comprising: inserting into a service request an originating network attribute and an encrypted originating network attribute encrypted with the private-key of a private-public key pair of an originating network operator; the respective public-key being made accessible only to authorized parties on a public-key server for decryption and verification of the originating network attribute by an authorized party receiving the service request.

Correspondingly, another aspect provides a method of communicating originating network information for multi-party billing of network services, comprising:
receiving a service request containing an originating network attribute and an encrypted originating attribute encrypted with the private-key of a private-public key pair associated with an originating network operator; extracting the originating network attribute, accessing a public-key server for look up of a respective public-key, decrypting and verifying the encrypted originating network attribute, and forwarding of the service request for completion.

Thus for example, when the network attribute comprises an originating network identifier, an originating network operator generating a service request sets the originator attributes and encrypts one of the attributes. The terminating network operator or service provider receiving the service request uses the clear text operator attribute to look up and retrieve the public-key of originating network operator for decryption of the encrypted operator attribute. A terminating network or service provider having access to the public-key as an authorized party, can verify, by matching the clear text and decrypted attributes, that the service request comes from an originating network or source that the service provider has a—direct or indirect—business relationship with. Thus, the service provider may initiate generation of appropriate billing records, or alternatively refuse or redirect the service request. Authorized parties may, for example, include network operators or service providers, or agents thereof, having a business or billing relationship with the originating network operator.

More particularly, a further aspect of the present invention provides a method of transmitting originating network information from an originating network to a terminating network for multiparty billing of telecommunications services, the method comprising: associating with an originating network attribute a private-public key pair of the originating network operator; generating a service request comprising an originating network attribute pair comprising a clear text network attribute and an encrypted network attribute, the encrypted network attribute being encrypted with the private-key of the originating network operator; making the respective public-key accessible on a public-key server to authorized parties for decryption and authentication of the originating network attribute on receipt of the service request by an authorized party.

For example, the originating network attribute comprises at least an originating network identification.

Making the respective public-key accessible to authorized parties typically comprises providing access only to parties such as terminating network operators and service providers having a billing relationship with the originating network operator for the requested service, to enable authentication of the originating network attribute and forwarding of the service request for completion, and generation of a service data record for billing, or alternatively to provide for a service request to be refused, if there is no appropriate billing relationship for chargeable services.

Decryption and authentication comprises lookup of the public-key associated with the originating network attribute, decryption of the encrypted network attribute, and authentication of the originating network identification if there is a match between the clear text network attribute and decrypted network attribute, to enable forwarding of the service request for completion.

The clear text network attribute may contain simply the originating network identification in clear text and the encrypted attribute contains the corresponding information in encrypted form. Alternatively, the clear text network attribute contains the originating network identification in clear text, and the encrypted network attribute contains in encrypted form the originating network identification, and optionally additional information relating to the service request. In this case, authentication comprises matching of at least the clear text network identification and decrypted originating network identification. Additional information relating to the service request may, for example, comprise one or more of an originator (subscriber) identifier, a time of service request, and information relating to class or quality of service.

Preferably, the network attribute pair comprising a clear text network attribute and an encrypted network attribute are provided as extensions of a service request protocol, and said extensions of a service request protocol may be provided by two network attribute value pairs providing the clear text network attribute and the encrypted network respectively. For example, the service request protocol may be based on SIP, H.323 or other IP based service request protocols, or may be based on SS7 in a switched network.

Thus, a service request includes information in the form of a network attribute identifying the originating network operator in clear text and in encrypted form, using encryption based on a private-public key pair of the originating network, to enable the originating network identification to be authenticated by an authorized party or terminating operator, before forwarding of the service request for completion by a terminating network operator, and generation of a billing record.

The method provides for accessing public-keys on a public-key server or key server network to which access is restricted to authorized parties, i.e. limited to other operators or parties having a billing relationship with the originating network operator. Thus, preferably the key server is in a protected network which provides for secure access, such as provided through a VPN (Virtual Private Network), to enable appropriate secure key distribution and management to selected authorized parties only.

Appropriate secure key distribution and management is required for making the respective public-key accessible to authorized parties comprises restricting access, for example, to authorized terminating network operators, and their agents, having a billing relationship with the originating network operator.

Thus, preferably, authorized parties having access to the respective public-key for decryption are restricted to terminating network operators, or service providers, having a direct or indirect billing relationship with the originating network operator. Authorized parties may also include authorized agents, such as clearing houses managing billing, or intermediate operators with a relationship with the originating network operator. In some cases, access to public-keys may be provided to an interconnection partner or a transit network operator providing interconnection between an originating network or access network operator and a termination network operator or service provider.

According to another aspect of the present invention there is provided a method of receiving network operator information from an originating network operator for multiparty billing of telecommunications services, comprising: receiving a service request comprising a network attribute pair comprising a clear text network attribute and an encrypted network attribute, said encrypted attribute having been generated using a private-key of a private-public key pair associated with the originating network operator identification, accessing the respective public-key of public-private key pair of the originating network operator on a public-key server accessible to authorized parties, decrypting the encrypted network attribute, and if there is a match between the decrypted network attribute and the clear text network attribute, verifying the originating network operator identification, forwarding the service request for completion.

If the decrypted network attribute does not match the clear text attribute, the service request may be refused or redirected.

The step of accessing the respective public-key typically comprises restricting access to authorized parties, such as terminating network operators and their authorized agents having a billing relationship with the originating network operator. When the public-key cannot be accessed, or if the decrypted network attribute does not match the clear text attribute so that originating network identification cannot be verified, such as when there is not an appropriate billing relationship with the originator, the service request may be refused by the terminating network.

In addition to providing originating network identification, the service request may include an originating network attribute providing additional information relating to the service request, for example one or more of an originator identifier and a time of service request, set by the originating network operator or its agents. Thus, optionally, subscriber identification, eg. a subscriber URI, may also be encrypted in a similar way using the originating operator's private-key, to avoid modification of the subscriber identifier in transmission, and billing of the wrong subscriber by the originating network operator. Additional verification steps based on additional information carried by the service request may performed for example, querying a number portability database to verify the affiliation between the subscriber identification and the originating network operator.

For increased security, the public-key of the originating network operator may be signed with the key of a certificate authority. Periodic key updates may be generated for private-public key pairs of the originating network, setting new key validity periods.

In a practical implementation, for an attribute pair wherein the clear text attribute comprises the originating network identification, and the encrypted attributed comprises the encrypted originating network identification, the latter is encrypted using the originating network operators private-key, and the attribute pair may be provided as extensions of a SIP protocol service request, and/or other known protocols used for service requests.

An extension defined for a service request protocol format, such as a SIP protocol service request, may include two additional attribute value pairs: an originating network attribute which contains at least an originating network identifier in clear text, and a corresponding encrypted originating network attribute.

Protocol translation may occur between the originating network and the terminating network. For example, service requests carrying originating network operator identification may be based on SIP and IMS service. Mapping to other protocols may be used to carry information including originating operator identification, as long as operators at both ends of the conversion agree on the appropriate mapping, and for example, different protocols may be used on the access side and the terminating side before and after originating network information is applied or verified, or in transit.

The network attribute may contain originator attributes, e.g. originating network information including originating network identification and subscriber information such as a subscriber identification or URI, or an originating network generated originator URI, and additional information associated with the service request such as time of request, which may also be defined as part of protocol extensions. Depending on capabilities of the originating and terminating networks, and service request protocols the method may comprise further steps of stripping the network attribute value pair before forwarding the service request for completion, for example to conform to a basic SIP service request protocol. Alternatively, it may include modifying the network attribute value pair before forwarding the service request for completion, for example, to add one or more of, an indicator of authentication of originating operator identification, an indicator of authentication for subscriber information, an indicator that service is billable.

According to a further aspect of the invention there is provided a system for transmitting originating network information from an originating network to a terminating network for multiparty billing of telecommunications services, the system comprising: in an originating network, a network element for generating a service request comprising a originating network attribute pair comprising a clear text network attribute and an encrypted network attribute, the encrypted network attribute being encrypted with the private-key of a private-public key pair of the originating network; a public-key server accessible to authorized parties and storing the respective public-key of the private-public key pair; in a terminating network, a network element for receiving said service request and acting on the originating network attribute pair to look-up and retrieve, based on the clear text network attribute, a respective public-key associated with the originating network attribute for decryption and authentication of the network attribute, forwarding the service request for completion.

The originating network attribute comprises at least an originating network identification. The network element provides for decryption and authentication comprising lookup of the public-key associated with the originating network attribute, decryption of the encrypted network attribute, and verification of the originating network identification if there is a match between the clear text network attribute and decrypted network attribute. When the service request is forwarded for completion, the network element may also trigger generation of a billing record. Alternatively, when authentication fails, the service request may be refused or redirected.

Another aspect provides a system for transmitting originating network information from an originating network operator to a terminating network operator for multiparty billing of telecommunications services, comprising: in an originating network, a network element for generating a service request containing an originating network identification comprising a network attribute pair comprising a clear text attribute and an encrypted attribute encrypted with a private-key of a private-public key pair of the originating network; the network element providing for a secure communication link with a public-key server for storing the respective public-key for access by authorized parties for decryption of the encrypted attribute to enable verification of the originating network identification on receipt of the service request by an authorized party.

Yet another aspect provides a system for transmitting information from an originating network operator to a terminating network operator for multiparty billing of telecommunications services, comprising: a network element in a terminating network for receiving a service request containing originating network identification comprising an attribute pair comprising a clear text network attribute and an encrypted network attribute encrypted with a private-key of a private-public key pair of the originating network; the network element providing for a secure communication link to a key server accessible to authorized parties for look-up of respective the public-key of a respective originating network operator, and on retrieval of the public-key, the network element performing steps of decrypting of the encrypted network attribute, comparing of the clear text network attribute and the decrypted network attribute, and if there is a match between the clear text network attribute and decrypted network attribute, verifying the originating network identification, forwarding the service request for completion.

Also provided is a system for transmitting originating network information from an originating network operator to a terminating network operator for multiparty billing of telecommunications services, comprising: a key server accessible to authorized parties and storing public-keys of private-public key pairs of originating network operators, each public-key being associated with an originating network identification of a respective originating network operator; the key server providing for a secure communication link with an originating network operator for receiving and updating public-keys of said originating network operator, and the key server providing access for lookup and retrieval of a public-key of an originating network operator only to authorized parties having a billing relationship with the respective originating network operator.

Beneficially, the key server comprises part of a distributed key server network. The key server comprises part of a secure protected network having access restrictions to provide secure access only to other service providers or network operators, or their authorized agents, having billing relationships with the originating network operator or service provider.

It will be appreciated that the system and method is applicable to multiple diverse networks, serviced by a single key server, or a distributed key server network which provides appropriate secure key distribution and management. As noted above, access to public-keys on a public-key server is typically restricted to other operators or authorized parties with a billing relationship with the originating network operator, for example by locating the public-key server in a protected network which is accessible only to authorized users through appropriate secure managed access, such as a VPN tunnel. Authorized parties may include terminating network operators and/or their agents, and clearing houses, and authorized transit or interconnection network operators.

Thus, a network element in a terminating network receiving the service request, when there is a billing relationship with the originating network operator, based on the clear text attribute may access the associated public-key for the originating network operator to decrypt the encrypted attribute, and verify the originating network identification. If the originating network identification is authenticated, the network element forwards the service request for completion of a service request and triggers generation of a billing record (or a service data record), or, alternatively, may refuse the service request. A terminating network operator or service provider can thus verify that the service request comes from a subscriber of an originating network operator that the service provider has a—direct or indirect—business relationship with, and thus generate associated billing records for the requested service.

Aspects of the present invention, therefore, allow network operators and service providers to identify a user and an originating network operator for a service request, with minimal changes to existing infrastructure. Preferably, the system supports known existing international billing and collection relationships between the originating network operator or a clearing house acting on its behalf, and the service provider or a clearing house acting on its behalf.

Optionally, the system also supports other security functionality based on the availability of a private-public-key pair associated with the originating network operator identification. Additional functionality may include, e.g. message encryption and message integrity checks, identification, for example, as described for in U.S. patent application 60/996,240 entitled "System, method and software for secure electronic communication services" to the same inventors.

More specifically, verifying an originating network attribute comprises performing at a network element in a terminating network, the steps of receiving a service request including a network attribute pair comprising an originating network attribute value and an encrypted originating network attribute value, encrypted using a private-key of a private-public key pair generated by the originating network operator; extracting the originating network attribute value; accessing a key server looking up a public-key of the originating network associated with the originating network attribute value; decrypting the encrypted originating network attribute value using the public-key of the originating network; verifying that the decrypted originating network attribute matches the originating network attribute; verifying that the terminating network has a contractual relationship with the identified originating network covering billing of the requested service; forwarding the service request for completion, and triggering generation of a service data record for billing; otherwise if verifying fails, refusing the service request.

In practice, the key server may comprise a single key server or a distributed public-key server network to which access is restricted to other operators or parties having a billing relationship with the originating network operator. Extensions to service request protocols, such as SIP service request protocols, are used to identify the originating network operator both in a clear text attribute as well as in an encrypted attribute. The originating network operator sets the originator attributes and encrypts one of them. The service provider uses the clear text operator attribute to retrieve the public-key of this operator and to decrypt the other operator attribute. In this way, the terminating network or service provider can verify that the service request comes from a subscriber of an operator the service provider has a—direct or indirect—business relationship with.

Thus, there is provided a scalable and distributed system to allow business partner authentication in systems exchanging chargeable information via generic and potentially insecure networks. This approach to authentication of the originating network operator identification allows for more reliable billing of services provided on behalf of a business partner and its customers, and additionally provides for verification of subscriber information in a similar manner. This system and method is particularly useful when value added services are provided to subscribers of other networks.

BRIEF DESCRIPTION OF THE DRAWINGS

Embodiments of the invention will now be described by way of example only, and with reference to the accompanying drawings, in which:

FIG. 1 shows a schematic representation of a telecommunications network and system components involved in a service request for transmitting originating operator identification for multiparty billing according to an embodiment of the invention;

FIG. 2 shows a schematic representation of the key distribution in a system for multiparty billing according to an embodiment of the invention; and FIG. 3 depicts the flow of relevant billing information according to an embodiment of the invention.

DETAILED DESCRIPTION OF PREFERRED EMBODIMENTS

A simplified network representing a system according to an embodiment of the present invention is shown schematically in FIG. 1. A subscriber or originating user 10 is connected via a client computer, phone, or other subscriber terminal 100 to an originating network 200 operated by originating network operator A. Usually, the originating network is the access network connecting the subscriber's premises to the worldwide telephone network and/or to the Internet, and the subscriber 10 has a service contract with the originating network operator A. To initiate service, a service request 120, for example using SIP protocol is sent from the subscriber terminal 100. The request 120 is muted to a network element 210 in the access network operator's network, which may be implemented, for example, through a softswitch, or an IMS (IP Multimedia Subsystem) P-SCSF (Proxy Call/Session Control Function) or S-SCSF (Serving Call/Session Control Function).

The network element 210 verifies the user supplied originator URI and optionally adds a network supplied originator URI. By muting, the network can ensure that network element 210 gets only service requests from its own subscribers. The network element 210 checks whether the service requested is available within its own network, or whether the request has to be routed into another network.

In the latter case, the network element 210 generates an enriched service request 220 by adding a clear text attribute 261 comprising the originating operator identification and a corresponding encrypted attribute 262. The corresponding encrypted attribute is generated using a private-key 240 of a private-key/public-key pair 240/250 (herein after abbreviated referred to as private-public key pair) of the originating network operator. The latter may be generated by the originating network operator or an agent providing key services. In the current widely used IP-based protocol for service requests, Session Initiation Protocol (SIP), addition of an attribute pair 260 comprising an unencrypted originating network identification 261 and an encrypted originating network identification 262 can be done by defining two additional Attribute Value Pairs (AVPs), such as Originating-Network and Originating-Network-Info, where Originating-Network would contain a plain text identifier of the network, (i.e. originating network identification) and Originating Network-Info would contain encrypted information including the originating network's identifier. As is conventional in public-key infrastructure, the public-key of the private-public key pair of the originating network operator is made available on a public-key server 610. Preferably the public-key server 610 is located in a protected network so as to be accessible only to authorized parties i.e. a restricted group of other network operators and service providers in a billing relationship with the originating network operator.

The enriched service request 220 is then routed to its destination through any other network or sequence of networks, which is represented in FIG. 1 by Public Network 300. The enriched service request 220 is finally routed to the Terminating Network 400 to which the service provider 500 is connected. The Terminating Network 400 will route the enriched service request 220 through a network element 410 that acts on the additional Attribute Value Pairs (AVPs), i.e. the Originating-Network and Originating-Network-Info to obtain the originating network identification and encrypted information.

In this example, network element 410, performs the following steps:

Extract the plain text originating network operator information from the Originating-Network attribute value.

Look up (630) the public-key of this network from the Key Server 610 situated in a protected network 600.

Decrypt the Originating-Network-Info value using the originating network's public-key.

Verify that the Originating-Network-Info contains the same originating network identifier as the Originating-Network value.

Verify that the Terminating Network 400 has a contractual relationship with the Originating Network 200 that covers billing of the requested service to the Originating Network. If not, reject the service request.

After authentication of the originating network identification, further steps may also be performed to modify the service request, by stripping or adding information before the service request 420 is forwarded to the service provider for completion.

Optionally strip the additional Attribute Value Pairs (AVPs), i.e. unencrypted and the encrypted originating network identifier so that the service request 420 which is forwarded to the service provider 500 conforms to basic SIP protocol specifications.

Optionally add information in the service request 420 that informs the service provider about, the fact that the originating network operator has been identified and authenticated, and that the service is billable.

Then the service request 420 is forwarded to the Service Provider 500 for completion and a billing record is generated as will be described in more detail below with reference to FIG. 3.

The system for multiparty billing depends on secure key distribution and management. The simplified network depicted in FIG. 2 illustrates secure key distribution according to an embodiment of the invention. The Originating Network 200 operates an asymmetric key generator 230. Once, or periodically, the Key Generator 230 generates a private/public-key pair for the Originating Network 200 which is to be associated with the Originating Network identification for encryption of the originating network identification.

- The generated private-key is uploaded 240 to the Network Element(s) 210 which inserts the Originating Network Identification into service requests 120.
- The generated public-key is uploaded (250) to the Key Server 610 in the protected network 600, via a secure connection, e.g. a VPN tunnel.

When the terminating end verifies the Originating Network Identification in a service request 220, it queries the public-key of the originating network from the Key Server 610 in the protected network 600, via a secure connection 630 to enable decryption of the encrypted originating network identification to allow for verification that the decrypted originating network identification matches the clear text originating network identification and thus demonstrates it has not been changed or corrupted. Thus, the terminating service provider has confirmation that the originating network provider is authenticated.

Beneficially, the system may also provide the following features:

- Nobody outside the originating network can generate the encrypted part of a valid Originating Network Identification for this network operator using the private-key of the originating network to sign the Originating Network Identification. (i.e. the privacy of the originating operator's private-key must be appropriately maintained)
- Rules may be set such that any modification of the Originating Network Identifier during transmission may, invalidate the Identification and leads to rejection of the service request, if the terminating Network Element 410 operates according to the rules.
- A valid modification may be permitted which allows a transit network operator to replace the originating network's identification with its own identification. By doing this, the transit network operator accepts the responsibility to pay for the service. This does not hurt the originating subscriber and the originating network operator and may enable new business models.
- All authorized operators taking part in the multiparty billing system can verify the Originating Network Identification.
- The system allows for frequent key changes as needed.

A simple example that illustrates flow of billing information from the service provider 500 back to the originating subscriber 100 according to an embodiment of the invention is shown in FIG. 3

The service provider 500 generates a service data record 550 containing the originating user identification and the price charged for the service, i.e. referred to as rated service data record 550.

The Terminating Network 400 operating the Network Element 410 which verifies the Originating Network Identification generates a service data record 450 including the originating network identification, and optionally other information, e.g. indicating the originating network information has been verified for billing purposes Both service data records (450 and 550) are sent to the Terminating Billing Center 700. This Billing Center may be operated by the Terminating Network Operator 400, or by a Clearing House working on behalf of this operator, and possibly on behalf of other operators as well.

Clearing houses may work on behalf of either originating operator or service provider, for billing and also for operation of network elements, inserting and terminating the operator identification and require appropriate access to public-keys on key servers. A clearing house acting on behalf of the originating network operator needs write access only, to put a public-key on the joint public-key server. A clearing house acting for the service provider needs read access only to retrieve the public-key of the originating service provider. Thus, clearing houses would be included in authorized parties having appropriate key server access.

In the Terminating Billing Center 700, service data records from the Service Provider 500 and from the Terminating Network Operator 400 are correlated (710) using the user identification, time of service and other data conventionally collected for billing and associated purposes. This results in rated service data records including originating network information (750).

These service data records are sent to the respective Access Billing Center 800 working for the originating network operator identified in the service data record 750. As is known, the Access Billing Center 800 may be operated by the Originating Network Operator 200 or by a Clearing House working on behalf of this operator, and possibly on behalf of other operators as well.

The Access Billing Center assigns the Service Data Records 750 to subscribers of the originating Network Operator 200. The subscriber 10 will receive a bill containing the service data record originating from her/his clients or lines. Typically, this bill may also contain fees for other services, such as periodic charges or services charged directly at the originating operator.

If the user information in the service data record 750 does not match any subscriber's information, typical processes for dealing with errors are implemented, i.e. in this instance, the service data record is written into an error queue to clarify how the associated service request 220 could be tagged with the Originating Network Identification that was verified by the Terminating Network Operator 400.

As additional hurdle against forging of operator's identities, the public-key of the originating network operator may be signed with the key of a certificate authority.

Beneficially, to inhibit "learning" and replay of encrypted operator identification, additional information may be included in the encrypted operator identification, e.g. the encrypted operator identification is enriched by additional information, such as the time of the service request, or other related data, in varying order.

In transmission of the service request, the subscriber identification may also be encrypted similarly to encryption of the originating operator identification, i.e. the subscriber information, such as an originator URI, may be encrypted with the originating network operator's private-key to avoid the subscriber identifier being modified in transmission, and the wrong subscriber being billed by the originating network operator.

Advantageously, the system provides for the originating operators to update or change their private-public-key pairs frequently. This involves generation of new private-publickey pairs by the originating operator on a periodic basis, and uploading of a new public-key to the joint key server, together with defining non-overlapping key validity periods. The key server must accept a time parameter to return old public-keys on request, since old keys may be needed in postpaid billing. Some tolerance with regard to the service request time should be built into the terminating end, to avoid a situation where it would be possible to modify the service request time in transmission and consequently get all service requests rejected, because the service request time would point to the wrong key.

The system described above therefore relies on a public-key server 610, in this case public-key server located in a protected network which provides for secure managed access to authorized parties only, i.e. to the originating access network operator to store and update public-keys, and to other parties, which includes the service provider for having a billing relationship with the originating operator for obtaining the public-key associated with the originating network identification.

Network element 210 in the originating provider's network inserts an unencrypted originating operator identification into a service request, as well as an originating network operator that is encrypted with the originating network operators private-key.

Network element 410 on the service provider's network extracts the unencrypted originating network operator identification; queries the public-key server 610 for the public-key of the originating network operator; decrypts the encrypted originating network operator identification with the public-key obtained; verifies that the encrypted information is equivalent with the unencrypted information and that the originating network operator is on a whitelist for the requested service; produces a billing record for the service for forwarding to the originating network operator Thus, the billing record is forwarded to the originating network operator for covering the service provider's inter-carrier service fee and enable the originating network operator to bill the service to its subscriber.

Where appropriate, the system may additionally query a portability database to verify the affiliation between the subscriber identification and the originating network operator.

It will be appreciated that, in addition to defining attribute pairs 260, for securely conveying network operator identification and subscriber identification, other information relating to the service request and billing information may be similarly encoded as part of an attribute pair 260 comprising a clear text attribute 261 and an encrypted attribute 262. Alternatively, the service request may include more than one attribute pair 260 of this format (i.e. each comprising a clear text attribute and an encrypted attribute). For example, network operator identification may be encoded in one attribute pair and, and subscriber identification, or other billing related information, may be encoded in a separate attribute pair.

A scalable and distributed system and method is provided for transmitting originating network information for multiparty billing of network services with improved reliability, particularly when value added services are provided to subscribers of other networks, for which price is determined at the terminating end. An originating network attribute, such as originating network identification, is associated with a private-public key pair of the originating network operator; a service request is generated comprising an network attribute pair containing a clear text attribute and an encrypted attribute, encrypted with the private-key of the originating network operator. The associated public-key is made available on a public-key server to authorized parties, e.g. network operators or their authorized agents, having a billing relationship with the originating network operator, to enable decryption and verification of the originating network identification by a terminating operator or authorized party receiving the service request; the latter performs a look-up and retrieves the associated public-key of the originating network operator on a secure public-key server; decrypts the encrypted attribute, and if there is a match of the decrypted attribute and clear text attribute, verifies the originating network identification, forwards the service request for completion, and triggers generation of a service data record for billing. An attribute pair may be provided as an extension of known service request protocols, and the network attribute may optionally include originating network identification, subscriber information, and other information associated with the service request. Identification and verification (authentication) of originating network attributes allows more reliable billing of services provided on behalf of the business partner and its customers, and inhibits potential fraud related to sending billing records for services to other operators and subscribers, in generic and potentially insecure networks; it is applicable globally without the need to know about national rules for user—operator assignment, and allows for clearing house outsourcing to reduce the number of bilateral contractual billing relationships.

INDUSTRIAL APPLICABILITY

Preferably, systems and methods according to embodiments as described above, and variations thereof, provide that Standard billing systems can be used throughout the billing flow.

Outsourcing to clearing houses is possible both at the originating (access) and at the terminating end.

Clearing houses can take over billing tasks on behalf of operators, as well as identification (210) and verification (410) services, if they operate appropriate networks with controlled interconnections to their operator customers.

The system is applicable internationally, since no national specific knowledge (e.g. about ported numbers or other mappings between user information and the originating operator) is required on the terminating end which provides and charges the service.

Thus, systems and methods described herein provide for securely managing multiparty billing of services with variable pricing between network operators or amongst a group of network operators or service providers. The system is applicable for online billing (e.g. of prepaid accounts) as well as for offline billing (postpaid billing). It is stable with regards to (i.e. independent of) the porting of numbers or subscriber identifiers from one operator to the other. It has applicability internationally, since no specific knowledge about subscribers or portability in the originating country is required. Also, no dedicated interconnections are required. Beneficially, all respective information can be transferred over shared infrastructure, in particular, over the public internet. The system supports clearing houses acting on behalf of the originating network operator or the service provider to reduce the number of bilateral billing relationships.

Embodiments described above relate to sending and receiving of information between network operators and service providers for billable or chargeable telecommunications services. It will be appreciated that methods and systems as described above may be more generally applied to other network services, where service providers and other business partners exchange chargeable information on potentially insecure networks such as the public internet, and where verification of the source of a service request, such as identification of a network or service provider or other party initiating a service request, and/or optionally verification of additional information associated with a subscriber and/or the service request, may be required to enable authorization to proceed with a service request, and generation of service records for billing of chargeable services.

The above-described embodiments of the invention are intended to be examples, and alternatives and modifications to the embodiments may be made by those of skill in the art, without departing from the scope of the invention which is defined by the claims appended hereto.

The invention claimed is:

1. A method of communicating originating network operator information from an originating network to a terminating network for multiparty billing of network services, the method comprising:
in a network element in the originating network, performing the steps of:
receiving a service request from a subscriber of the originating network operator, said service request including a reference to a billable service;
determining that the billable service is not provided by the originating network, and in response to the billable service not being provided by the originating network,
generating an enriched service request, wherein the generating comprises encrypting an originating network attribute with the private-key of a private-public key pair of an originating network operator, said originating network attribute identifying the originating network operator, and inserting into said service request a network attribute pair comprising a clear text version of the originating network attribute and the encrypted version of the originating network attribute; and
transmitting the enriched service request to a terminating network operator providing said billable service;
and
in a network element in a terminating network, performing the steps of:
receiving the enriched service request,
extracting from the enriched service request the clear text version of the originating network attribute of the network attribute pair,
accessing a public-key server and, using the clear text version of the originating network attribute, retrieving a public-key associated with the originating network operator and with the private-key,
decrypting, using the retrieved public key, the encrypted version of the originating network attribute,
verifying the originating network identification, and in response to determining a match between the clear text version of the originating network attribute and the decrypted version of the originating network attribute, forwarding the service request to a service provider in the terminating network.

2. A method according claim 1 further comprising the network element in the originating network storing the public-key of the private-public key pair of the originating network operator on the public-key server wherein the public-key is accessible only to authorized parties having a billing relationship with the originating network operator.

3. A method according to claim 1, further comprising:
in the network element in the terminating network, performing the steps of:
triggering generation of a billing record comprising the originating network operator identification.

4. A method according to claim 3 wherein the clear text version of the originating network attribute contains the originating network identification in clear text, and the encrypted version of the originating network attribute contains in encrypted form the originating network identification and additional information relating to the service request.

5. A method according to claim 4 wherein the network attribute pair comprising the clear text version of the originating network attribute and the encrypted version of the originating network attribute are provided as extensions of a service request protocol.

6. A method according to claim 5 wherein said extensions of the service request protocol are provided by two network attribute value pairs containing the clear text version of the originating network attribute and the encrypted version of the originating network attribute respectively.

7. A method according to claim 6 where the service request protocol comprises one of SIP, H.323, VoIP, other known IP based protocols and SS7.

8. A method according to claim 6 further comprising additional network attribute value pairs containing additional information relating to the service request.

9. A method according to claim 6 wherein the additional information relating to the service request comprises one or more of an originator/subscriber identifier, a time of service request, a class of service parameter, a quality of service parameter and other parameters.

10. A method according claim 1, wherein the public-key of the originating network operator is signed with the key of a certificate authority.

11. A method according to claim 1, wherein the originating network operator generates private-public key pairs and issues periodic key updates, and sets key validity periods.

12. A method according to claim 1 wherein the step of generating an enriched service request further comprises inserting or modifying service attributes defining said billable service, the service attributes setting conditions for verification, forwarding or refusal of the service request by the terminating network operator.

13. A method according to claim 12 further comprising, on receiving the service request from a subscriber, communicating with the subscriber regarding inserting or modifying the service attributes defining said billable service.

14. A method of communicating originating network operator information from an originating network to a terminating network for multiparty billing of network services, the method comprising:
in a network element in the originating network, performing the steps of:
generating a private-public key pair of an originating network operator;
sending the public-key of the originating network operator to a public-key server over a first secure communications link, said public-key being made accessible only to authorized parties comprising terminating network operators and their authorized agents;

receiving a service request from a subscriber of the originating network operator, said service request including a reference to a billable service;

determining that the billable service is not provided by the originating network, and in response to the billable service not being provided by the originating network, generating an enriched service request, wherein the generating comprises encrypting an originating network attribute with the private-key of the private-public key pair of the originating network operator, said originating network attribute identifying the originating network operator, and inserting into said service request a network attribute pair comprising a clear text version of the originating network attribute and the encrypted version of the originating network attribute; and transmitting the enriched service request to a terminating network operator providing said billable service; and in a network element in a terminating network, performing the steps of:

receiving the enriched service request, extracting from the enriched service request the clear text version of the originating network attribute of the network attribute pair, accessing the public-key server over a second secure communications link and, using the clear text version of the originating network attribute, retrieving the public-key associated with the originating network operator and with the private-key, decrypting, using the retrieved key, the encrypted version of the originating network attribute, verifying the originating network identification, and in response to a match between the clear text version of the originating network attribute and the decrypted version of the originating network attribute, forwarding the service request to a service provider in the terminating network.

\* \* \* \* \*